Nov. 12, 1940.    S. L. CHRISTIE    2,221,306
CONDUCTIVITY INDICATING SYSTEM AND METHOD
Filed March 2, 1938    2 Sheets-Sheet 1
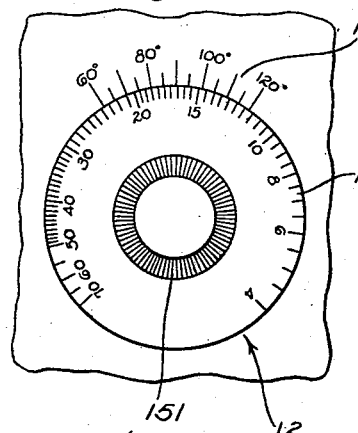
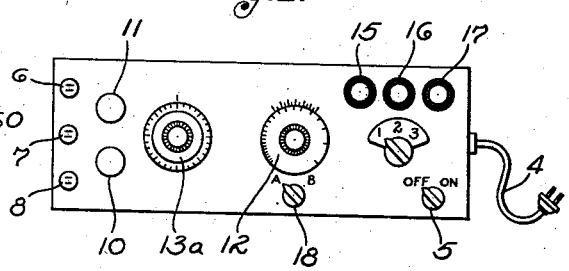
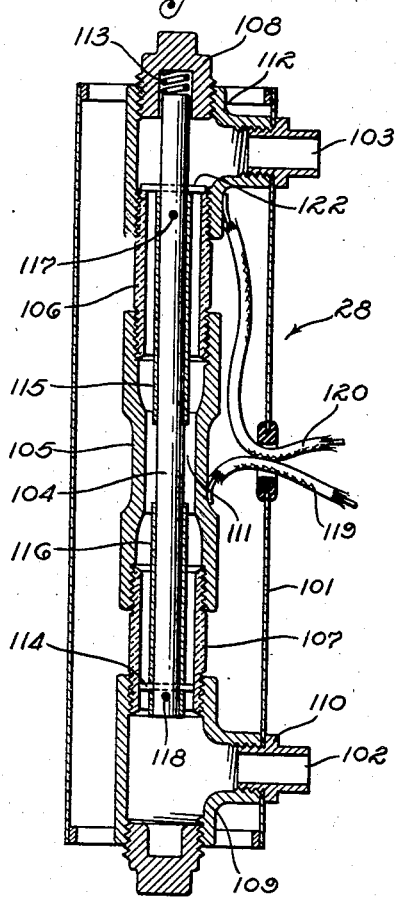
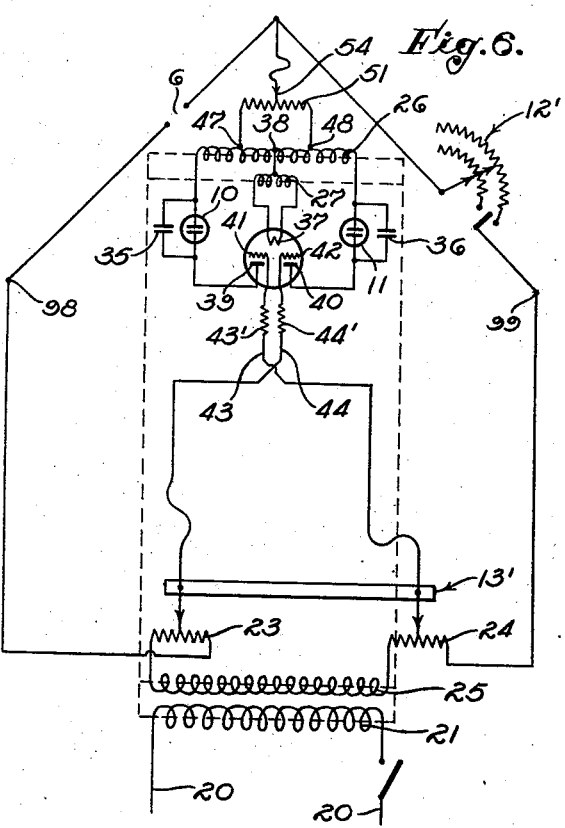
INVENTOR
SOREN L. CHRISTIE
BY HARRIS, KIECH, FOSTER & HARRIS
ATTORNEYS.

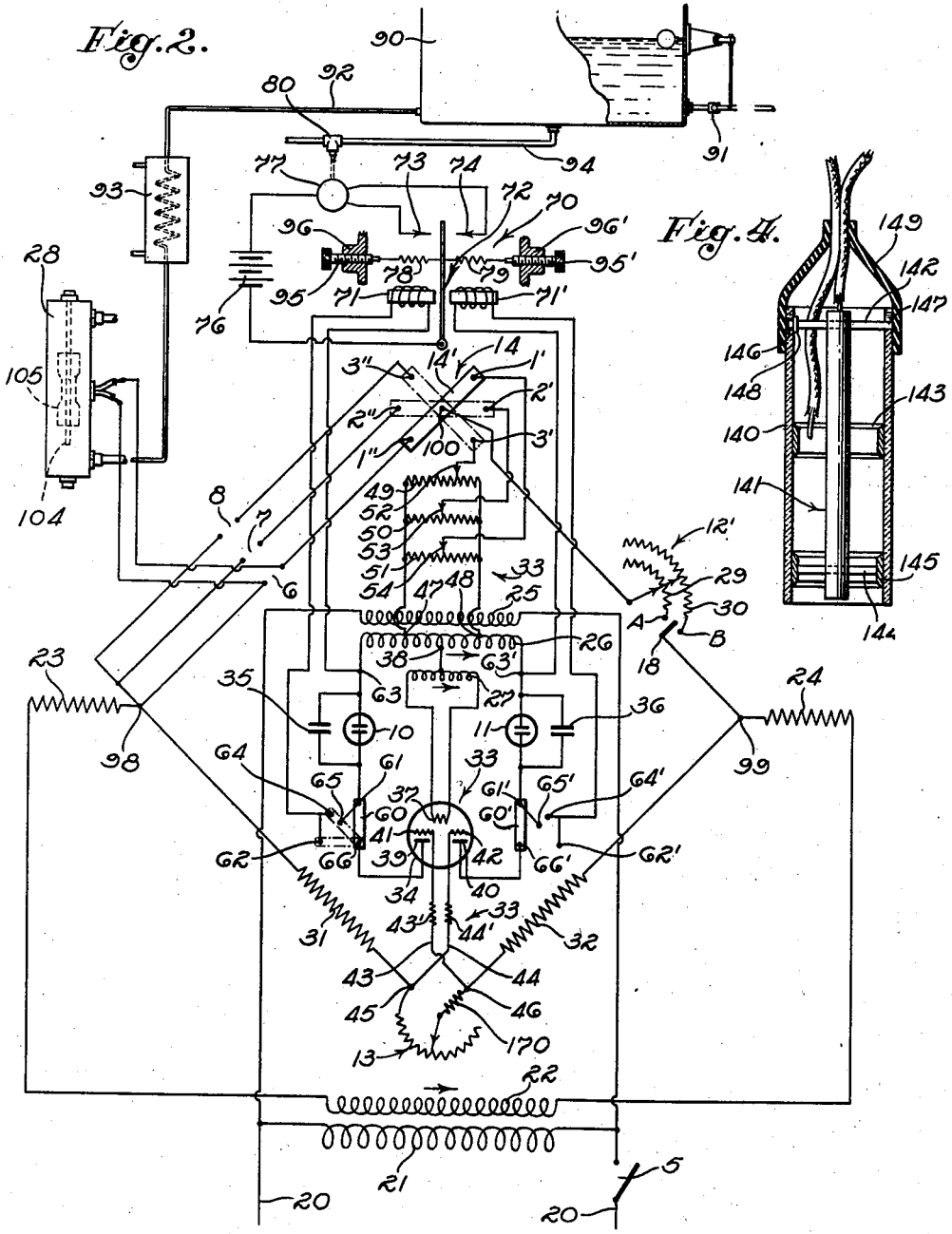

Patented Nov. 12, 1940

2,221,306

UNITED STATES PATENT OFFICE 2,221,306

CONDUCTIVITY INDICATING SYSTEM AND METHOD

Soren L. Christie, Los Angeles, Calif.

Application March 2, 1938, Serial No. 193,484

23 Claims. (Cl. 175—183)

This invention relates to apparatus and methods for determining or indicating the properties of materials, and more particularly relates to the determination or indication of electric impedance and associated properties such as electric resistance, conductivity, and the like.

My method and apparatus are particularly adapted to the testing of liquids to determine their impedance, conductivity, and associated properties such as salt concentration, or to indicate the presence of conducting impurities and the like.

It is an object of the invention to provide a method and apparatus for determining and indicating electric impedance, particularly of liquids, or of such associated properties as conductivity, salinity, and other properties dependent upon the conductivity or impedance.

It is frequently desirable, for example in the control of plant operation, that a liquid body or stream be kept at a given conductivity or within certain conductivity ranges, particularly in so far as the conductivity is a measurement of salinity or the degree of concentration of conducting impurities. For this purpose it is desirable to have an instrument which will not only measure or indicate the conductivity, but one which will also serve to command the operator's attention when the conductivity has departed from predetermined limits or to actuate a control relay.

It is accordingly an object of this invention to provide an apparatus for the determination of conductivity or impedance capable of serving as a control device and adjustable to give warning signals or operate relays connected with control equipment when the conductivity or impedance has risen above or fallen below certain predetermined maximum and minimum limits.

It is furthermore an object of the invention to provide an instrument of the class described which may be adjusted to the normal or mean value of the conductivity desired, and in which further adjustment is available with regard to the sensitivity or degree of departure from this norm on the part of the liquid tested in order to actuate the warning devices.

It is furthermore desirable that an instrument of this type be highly flexible and adapted to work on liquids of different or varying temperatures and over a wide range of conductivities.

It is accordingly an object of the invention to provide an instrument for measuring and/or indicating impedances and conductivities which instrument may be readily adjusted for operation on liquids of varying temperature and wide ranges of conductivity.

The invention consists in its broad aspects of a means for comparing the impedance to be tested with a calibrated balancing impedance, combined with two signal means and means for differentially energizing said signal means operative in response to a departure of the ratio of the two impedances from a predetermined value.

By the term "differential" and its derivatives as applied to the energization of the two signal circuits I intend to imply an energization which increases in one circuit and decreases in the other circuit in response to an increase in impedance ratio, and which decreases in the first named circuit and increases in the second in response to a decrease in impedance ratio, the energizations of the two circuits being in effect pivoted or balanced so that as one goes up the other goes down.

I have found that lamps, and particularly gaseous discharge lamps such as neon lamps, are particularly advantageous as signal means. As hereinafter illustrated, the advantage of their use depends, among other things, upon the fact that when such lamps are operated only slightly above the critical voltage, a slight drop in the impressed voltage may be made to cause the lamps to flicker and operate in an unsteady state, and with a further slight drop in voltage to go completely out, both of which phenomena may be used to give attention-compelling and unambiguous signals.

I have furthermore discovered an electrical network for the interconnection of such signal lamps with two impedances, one of which is the impedance being tested or controlled, whereby both lamps burn with equal and relatively low brilliance when the test impedance bears a predetermined ratio to the control or measuring or balancing impedance, and whereby one of said lamps flickers or goes out when the test impedance is higher than the control impedance, and whereby the other lamp flickers or goes out when the test impedance is lower than the control impedance. Furthermore, simultaneously with the decrease in energy in one lamp an increase in energy takes place in the opposite lamp. This electrical network, as hereinafter illustrated, also affords a means for pre-selecting the ratio of the two impedances with which equal brilliance of the lamps is obtained, and also affords a means of pre-selecting or varying the sensitivity of the response of the lamps to the departure of the ratio of the two impedances from said pre-selected ratio whereby the point of flickering or complete extinction of one lamp or the other may be caused to correspond to a predetermined increase or decrease of conductivity or impedance on the part of the test material.

It is accordingly an object of the invention to provide an instrument of the kind described in which the flickering or extinction of one or the other of two gaseous discharge lamps, particularly when combined with increased brilliancy of the opposite lamp, serves as a warning that the conductivity or impedance of the test material has exceeded or fallen below the control or balancing impedance by a predetermined amount, and in which, furthermore, the value of the control impedance may be set at any desired value.

The invention further consists in the use of an alternating current bridge for comparing or balancing the test and control impedances and having two gaseous discharge lamps or equivalent signals in the indicating or diagonal circuit, and means for differentially energizing said lamps in response to variations in the state of balance in the bridge.

The invention further resides in energizing such lamps or equivalent signals on alternate half-cycles of the current used to energize the bridge, as by suitable rectifying means, and in the provision of means for diminishing the signal energy on alternate half-cycles when the test impedance is lower than the desired or predetermined value, and for diminishing the signal energy on intervening half-cycles, i. e., those energizing the second lamp, when the test impedance is higher than the desired value. Furthermore with the decrease in energy of one signal there is caused an increase in energy of the other signal.

The invention further provides a means for such pivoting of signal energy in response to the direction and magnitude of the cross-potential or potentials across the indicating or diagonal circuits, and in particular provides a method for the amplification of the effect of such cross-potentials by means of vacuum or electronic tube circuits in which the plate current is used to energize the signal means.

Further objects and aspects of the invention will be apparent hereinafter.

Referring to the drawings,

Fig. 1 is an illustration of a suitable control and indicator panel.

Fig. 2 is an illustration of a schematic wiring diagram showing the bridge and indicating circuit.

Fig. 3 shows a conductivity cell embodying certain elements of my invention.

Fig. 4 is an illustration of another conductivity cell.

Fig. 5 shows in greater detail one of the dials shown in Fig. 1.

Fig. 6 is an illustration of another schematic wiring diagram.

Referring to Fig. 1, 4 is an electric cable normally connected with a source of alternating current. An off-and-on switch 5 is provided which may be used to shut off the supply of alternating current when the instrument is not in use. Bipolar sockets 6, 7, and 8 are normally connected by corresponding plugs and conductors to the electrodes of three different conductivity cells. 10 and 11 are neon lamps. A dial and control means 12 is connected to a variable impedance which balances the impedance of the conductivity cells. Dial 13a is a sensitivity control and dial by means of which the degree of unbalance between the variable impedance and the impedance of the conductivity cell which is required to start flickering of or to extinguish the light 10 or 11 may be varied at will. Selective switch 14 has stations 1, 2, and 3 corresponding to the three conductivity cell circuits plugged in at 6, 7, and 8. Dials 15, 16, and 17 indicate and control variable "scale constant" resistances which are respectively brought into effect when the selective switch 14 is at stations 1, 2, and 3 respectively, these resistances having been previously adjusted to give correct scale readings on the dial 12 with regard to the characteristics of the conductivity cell and materials whose conductivity is being measured therein, as hereinafter described.

Selective switch 18 has two stations A and B by means of which the readings on the dial 12 may be further modified in accordance with the character of the material being tested.

Referring to Fig. 2, conductors 20 of the cable 4 lead to a source of alternating current potential. The switch 5 is in one of these conductors and controls the energization and de-energization of the apparatus. A primary winding 21 of a transformer is connected between the conductors 20 and energizes the secondary winding 22 which supplies alternating current to the bridge through compensating resistances 23 and 24. Also connected to the power lines are the terminals of an auxiliary primary winding 25 used to induce current in an auxiliary secondary winding 26. A filament winding 27 is also energized by the primary winding 25. If desired, all three secondary windings 22, 26, and 27 may be operated in conjunction with a single primary winding, and all windings may be mounted on one common core, the embodiment shown being selected only as facilitating a better understanding of the invention. Instantaneous polarities of the secondary windings are indicated by arrows. The bridge shown includes two left arms or legs interconnected with each other and with the compensating resistance 23, and two right arms or legs similarly connected to the compensating resistance 24.

The upper left arm of the bridge provides means for connection to the impedance to be tested. Desirably, it is manifolded in triplicate for the reception of three different conductivity cells or, as indicated, it may include the bi-polar sockets 6, 7, and 8 adapted to receive one or more bi-polar plugs connected to corresponding test impedances. Fig. 2 shows a conductivity cell 28 connected to the socket 6 and which may be positioned at a remote point from the test apparatus if desired. A test impedance may thus be connected to one or the other of these three triplicate arms, or a plurality of impedances may be simultaneously connected to respective arms of this triplicate group. In the case of a conductivity measurement the impedance to be treated varies as a function of the resistance between the two electrodes in the cell 28 to be later described in detail.

The upper right arm of the bridge contains the balancing impedance 12', which I prefer to use in the form of a rheostat with a tapered impedance winding or element, as hereinafter explained. To increase the flexibility or range of the apparatus, I prefer to have two different windings available for the balancing impedance, namely, windings 29 and 30, which are selectively brought into operation according to whether the selective switch 18 is at station A or B.

The lower left and right arms of the bridge contain the fixed resistances 31 and 32 respectively which may or may not be of equal magnitude according to circumstances. These arms are joined at the lower corners of the bridge through the variable resistance or sensitivity controller 13 and small fixed resistance 170, thus affording a resistance between terminals 45 and 46, which is partly variable and partly fixed.

The upper corner of the bridge is closed through the selective switch 14. In its successive positions, a blade 14' of this switch connects the upper right arm of the bridge with one of the three upper left arms of the bridge, whereby the bridge may be selectively operated on one of three impedances or cells which may be connected to bi-polar connections 6, 7, or 8 if desired. In its successive positions the blade 14' of the selective switch 14 is also connected to an indicating circuit 33 through one of the three contact points 1', 2', or 3' (corresponding to stations 1, 2, and 3 of Fig. 1) conjugate to the contact points 1", 2", and 3" leading to the conductivity cells.

The indicating circuit 33 comprises connections to the upper and lower corners of the bridge leading to the indicating means, which latter comprises secondary winding 26, neon lamps 10 and 11, vacuum tube 34, and condensers 35 and 36 shunted across the neon lamps 10 and 11 respectively. The vacuum tube comprises a filament 37 energized by the winding 27. The filament circuit is connected to center or intermediate tap 38 of winding 26. The two end terminals of the winding 26 are connected through lamps 10 and 11 respectively, to the respective plate elements 39 and 40 of the vacuum tube 34. Grid elements 41 and 42 are controlling with respect to the plates 39 and 40 respectively. Connections 43 and 44 lead from the grid elements 41 and 42 and are crossed over to the terminal connections 46 and 45 respectively of the variable resistance or sensitivity control 13. Grid resistances 43' and 44' may be included in these connections if desired. The grid connections thus comprise the connections of the indicating circuit with the lower corners of the bridge. The connections to the upper corner of the bridge are made through a scale constant adjusting device which, in effect, provides for the shifting of the potential of the center tap of winding 26 with respect to the potential of the upper corner of the bridge. This device comprises three resistances 49, 50, and 51 shunted in parallel across the off-center taps 47 and 48 of the winding 26. These resistances are connected through slidable contacts 52, 53, and 54, respectively, to the contact points 3', 2', and 1' respectively, one of which points is at the potential of the top corner of the bridge according to the setting of the selective switch 14.

A schematic representation of a relay control which may be used in conjunction with or in place of the signal lamps is also shown in Fig. 2. It is illustrative of a method for controlling the salt content of boiler water. The boiler 90 is fed with fresh water through a float controlled valve 91 so that a constant water level is maintained in the boiler. A blowdown valve 80 in conjunction with a line 94 is used to remove water from the boiler 90 when the salt content thereof becomes too high, the removed water being replaced with fresh water through the automatic action of the valve 91. A continuous small test stream 92 is removed from the boiler 90 and passes through a thermostat or cooler 93 to bring it to a constant or predetermined temperature, and then passes through the electrolytic conductivity cell 28. The position of the blow-down valve 80 is controlled by a reversible motor 77, the operation of the motor being controlled by a relay device 70.

The relay device 70 consists of a pivoted switch arm 72 movable against the adjustable tensions in springs 78 and 79 to contact point 73 or 74 or free to take up a position intermediate the contact points, the position and movement of the arm 72 being dependent on the relative energizations of solenoids 71 and 71'. When the arm 72 contacts the point 73, a battery 76 runs the motor 77 in one direction, and when the arm 72 contacts the point 74, the motor is run in the reverse direction, while in the intervening position the motor remains stationary.

One lead to solenoid 71 is connected to tap 63 in the left-hand auxiliary circuit above the lamp 10. The other lead from solenoid 71 is brought down to switch points 62 and 64. A switch bar 60, pivoted about a point 66, may contact only point 61, whereby only the lamp is in circuit, or may contact points 64 and 65 simultaneously, whereby both the lamp and solenoid are in circuit in parallel, or may contact point 62, whereby only the solenoid is in circuit.

Corresponding connections are made from solenoid 71' to the right-hand auxiliary circuit and corresponding members are given corresponding primed numbers.

The operation of the relay control may be explained as follows:

As hereinafter explained, the energization of the left-hand auxiliary circuit is lowered and that of the right-hand circuit is increased when the conductivity of the solution flowing through conductivity cell 28 is high, as when the salt concentration has been increased due to evaporation in the boiler. An opposite relationship between the circuit energization obtains when the salt concentration or conductivity of stream 92 is low. At intermediate concentrations centering around a concentration according to the preselected setting of the variable impedance 12' and with a latitude corresponding to the sensitivity adjustments made on the instrument, the circuit energization and correspondingly the magnetic attraction of the two solenoids, is sufficiently near equality that the switch arm 72 of the relay 70 remains in an intermediate position wherein no current is fed to the motor 77. With an increase in salt concentration beyond these limits, however, the magnetic attraction of solenoid 71' is sufficiently greater than that of solenoid 71 to pull the switch arm 72 into contact with point 74, whereby the motor 77 runs in a direction to open the valve 80 and drain the boiler of its salty water. During this period fresh water is introduced automatically into the boiler by means of the valve 91 operating in response to a fall in level in the boiler. When the water in the boiler has been sufficiently diluted or replaced with fresh water so that the conductivity of the stream 92 corresponds to the values within the pre-selected range, the energization in solenoid 71' decreases and that in solenoid 71 increases to a point where the switch arm 72 again assumes an intermediate position. The introduction of fresh water into the boiler continuing, as well as the drainage of salty water through the valve 80, the conductivity of the stream 92 becomes increasingly smaller, however, to the point where the solenoid 71 becomes controlling and closes the relay of contact 73. The motor 77 then operates to close down the valve 80. Then as the salt concentration of the stream 92 again increases to within the prescribed limits, the arm 72 again assumes an intermediate position, from which a similar cycle may be repeated. The motor 77 may be so constructed that it will not over-run limits corresponding to complete closure or complete opening of the valve 80.

The sensitivity of response of the relay, i. e., the degree of change in salt concentration required to actuate it one way or the other, may be in part controlled by the sensitivity control 13, as hereinafter explained with regard to the functioning of the lamps. I prefer, however, to provide a supplementary sensitivity control for the relay in the form of a variable spring tension on the arm 72, for example the springs 78 and 79 may be secured by threaded members 95 and 95' rotatable in fixed threaded members 96 and 96', whereby the rotation of members 95 and 95' serves to change the tension on the springs 78 and 79 respectively. By increasing the tension on these springs, an increased unbalance of the bridge is necessary to actuate the relay, corresponding to an increased permitted range of salt concentration.

Fig. 3 is a cross section of a conductivity cell which embodies certain elements of my invention. This conductivity cell is particularly suitable to continuous use on flowing streams of fluid.
It is provided with an inlet member 102 and an outlet member 103 whereby the water or other fluid may be continuously passed or circulated through the cell. The cell is provided with an inner cylindrical electrode 104 and an outer sleeve electrode 105, and the fluid whose conductivity is to be measured is passed through the intervening annular space 111 which constitutes the main current path.

At the bottom of housing 101 a side entrance is provided through which the inlet member 102 is inserted. A T 109 receives the inlet member 102 in its threaded branch connection, and by means of a shoulder 110 carried by the inlet member 102, the T 109 and inlet member may be firmly fixed to the housing 101. The bottom of the T 109 is closed with a plug which may be removed for cleaning or draining purposes. The upper branch of the T 109 carries an insulating nipple 107, on which is fixed the sleeve electrode 105.

The upper end of the sleeve electrode 105 is joined to an insulating nipple 106 which is connected to an upper T 112 secured to the housing 101 in the same way as the T 109. The other branches of the T 112 receive an upper plug 108 and outlet 103 respectively.

The plug 108 provides a recess into which the upper end of the cylindrical electrode 104 extends, and is electrically connected with the electrode 104 by means of a spring 113. The recess in the plug 108 serves to center properly the upper end of the electrode 104. A pin 122, abutting on the end of the nipple 106 takes up the pressure of the spring 113. The lower end of the electrode 104 is centered or spaced by means of pins 114 and 118 which may be of either conducting or insulating material, the ends of which contact the insulating nipple 107. The pins 114, 118 and 122 pass through the member 104 and are firmly fixed therein. The electrode 104 is insulated over the greater part of its length other than that immediately adjacent the sleeve electrode 105 by insulating sheaths 115 and 116, which serve to largely restrict the current path to an annulus 111. By these means the electrolytic conduction is restricted to a region free from spacing elements or other surfaces liable to fouling or contamination, and hence the danger of current leakage on salt-encrusted or otherwise conducting surfaces is eliminated. A hole 117 in the cylindrical electrode 104 may be used to secure the upper insulating sheath in position by means of a suitable pin.

The electrode 105 is connected to the conductivity measuring instrument by means of wire 119. The electrode 104 is connected by means of the spring 113, plug 108, and T 112 to the wire 120 leading to the instrument. The insulated wires 119 and 120 lead to a plug which can be inserted in one of the sockets 6, 7, or 8 and thus be connected to the bridge.

Fig. 4 illustrates in partial cross section another form of conductivity cell particularly adapted to test samples, and which may be used by simply immersing the cell in the water to be tested. The housing 140 is a cylindrical non-conducting shell. An inner cylindrical electrode 141 is suspended from a cross pin 142. The second electrode 143 is formed as a ring of conducting material and is firmly secured to the inner wall of the insulating housing 140. The cylindrical electrode is axially centered by the joint action of the cross pin 142 and a lower cross pin 144, both pins being firmly secured in the electrode. The pin 144 acts to center the bottom portion of the electrode 141 by the contact of the ends of the pin with spacing ring 145, the latter being fixed to the housing. The upper cross pin 142 is accurately oriented by having one end inserted in a hole 146 in the housing 140, and the other end resting in a slot 147 in the housing 140, and its position is further fixed by a shoulder 148 which abuts against the inner wall of the housing. The pin 142 is constrained to retain its position by the compressive force of rubber cap 149 which acts on a prolonged portion of the pin 142 extending somewhat outside the slot 147. The inner electrode assembly may be readily removed for cleaning by removing the rubber cap, withdrawing the pin 142 from the hole 146, and lifting the inner electrode assembly from the housing. By inserting a suitable brush the annular electrode in either construction shown in Figs. 3 and 4 can be conveniently cleaned after removal of the inner cylindrical electrode member.

Fig. 5 shows in greater detail the control and indicating dial 12 shown in Fig. 1. The dial 12 is secured to a knob 151, which is suitably linked to the variable balancing or control impedances shown as 12' in Fig. 2. As previously indicated these variable impedances are made with tapered characteristics in such a way that equal angular increments in the position of the knob 151 correspond to equal percentage changes in the measured values indicated by the markings on the dial 12. A logarithmic scale 160 is engraved on the rim of the dial 12 so that the registration of this scale with a fiducial point suitably indicates the impedance or units associated with impedance, such as conductivity, salt concentration, and the like. Attached to the panel or other fixed support is a scale element 157 bearing a substantially linearly graduated temperature scale. Since equal increments in temperature cause approximately equal percentage changes in conductivity of electrolytic solutions or similar materials, it is possible, by proper correlation of the characteristics of the two scales, to indicate the correct unit directly on scale 160 by taking as the fiducial point a point on the scale 157 which corresponds to the temperature of the liquid being tested. Thus, if the scale constants have been properly selected by adjustment of the scale selector, the impedance of a solution having 16 grains of a certain salt per gallon at 80° F. may be balanced when the dial 12 is in such a position that the marking 16 on the scale 160 is directly under or opposed to the marking 80° on the scale 157. When the temperature of the test solution is raised to 100°, the bridge will again be balanced when the variable impedance is so changed that dial 12 moving therewith has brought the figure 16 on the scale 160 in opposition to the figure 100° on the scale 157. The proper magnitude of the spacing intervals on the linear temperature scale as well as the proper taper of the balancing impedance 12' may be determined either by calibration or calculation so as to produce this result.

When it is desired to measure in units which are directly proportional to conductivity, or to correct conductivity to a given temperature, the logarithmic scale should increase in the reverse direction from the direction of increase on the temperature scale. For example, if the logarithmic scale is to be read in units of concentration of a given salt, it will be apparent that an increase in temperature should indicate a lower salt concentration for the same conductivity and impedance of the solution.

The positions of the two scales as shown may be interchanged and the same results obtained. Thus, the fixed scale may carry the logarithmic intervals, and the movable scale element carry the linear scale. It is furthermore not necessary that the scales be circular in form, as illustrated. For example, I may use a slide wire resistance as my variable impedance and indicate the position of the sliding contact by the registration between two scales, one fixed and one movable, one of said scales carrying the logarithmic calibrations corresponding to the logarithmic character of the slide wire used, and the other of said scales being substantially linearly graduated in temperature intervals.

The diagram shown in Fig. 6 is essentially the same as that shown in Fig. 2, with the exception that the lower part of the bridge as shown in Fig. 2, comprising resistances 31 and 32 and sensitivity controlling rheostat 13, has been eliminated and the crossed grid connections 44 and 43 brought to slidable contacts on resistances 23 and 24 jointly movable by insulating bar 13'. By sliding this bar 13' the potentials of the two grids may be simultaneously varied.

The circuits which I use provide a method of balancing an adjustable impedance against the unknown impedance of a conductivity cell or other impedance element and of visually indicating a state of balance or unbalance by the relative brightness of two lamps, or by the flickering or complete extinction of one lamp combined with increased brightness of the other lamp if the unbalance exceeds a preselected value. This oppositely responding action of the two indicating means is an important feature of my invention.

My invention also provides a method of control by which the balancing or control impedance may be set at a given value and a warning or controlling relay actuated if the test impedance departs from a predetermined ratio to the control impedance to a greater extent than corresponds to a preselected latitude.

The essential parts of the system shown comprise the variable impedance which may be balanced in a suitable network against the impedance of the conductivity cell or brought to a given ratio thereto, and a cross connection or indicating circuit in the network having two side or auxiliary circuits the energization of one of which circuits is increased and that of the other circuit simultaneously decreased when the impedance offered by the liquid in the conductivity cell is higher than the proper ratio, the energization of the other of said circuits being increased simultaneously with a decrease in the first circuit when the test impedance is lower than the proper ratio. These oppositely responsive side or auxiliary circuits may be used to activate signal means, control devices, and the like.

When an alternating current is impressed upon the bridge shown in Fig. 2 by means of the secondary winding 22 feeding through resistances 23 and 24, a synchronous potential is also impressed upon the side circuits by secondary winding 26. Assuming that the center point 38 connecting to the cathode 37 is considered to be at zero potential then in the case of balance the point 45 at the lower portion of the bridge will assume a positive potential and point 46 in the same instance a negative potential of same magnitude when point 98 is positive with respect to point 99.

If no additional potential is introduced between point 38 and the upper corner 100 of the bridge, i. e., if the sliding contact 54 is moved to contact a certain intermediate point on the slide wire 51 corresponding in potential to point 38 then the upper corner 100 will also be at zero potential. Point 63 connecting through lamp 10 to plate 39 will assume a positive potential with respect to the cathode 37 when, as assumed above, point 98 is positive, thus allowing current to flow in the left plate circuit, controlled by the grid 41 which is connected to the negative potential at point 46.

Point 63' connecting through lamp 11 to plate 40 will in the same instance assume a negative potential with respect to the cathode 37. Due to the valve action of the tube no current will therefore flow through the plate circuit on the right hand side even though the corresponding grid 42 is at a positive potential.

During the other half cycle the opposite action will take place, current will flow in the right hand plate circuit and be interrupted in the left hand circuit. Thus it is seen that each grid is always operating at a negative potential during that part of the cycle in which current flows in its corresponding plate circuit. Whatever potential the grid assumes in the other half cycle is of no consequence. Each neon lamp is thus fed during one half cycle and is extinguished during the other half cycle.

If the magnitudes of both grid potentials are equal both lamps will glow with equal intensity. This intensity can be controlled by varying the impedance 13. By increasing the impedance between points 45 and 46 from zero and up, the grid potentials during the effective half cycles are varied from zero to an increasing negative value, thus gradually reducing the current through both lamps by varying a single unitary adjusting device.

The balanced condition as assumed above is destroyed by any change in the ratio of the impedance of the conductivity cell 28 to that of the variable impedance 12'. If the conductivity of the liquid in the cell is increased, the potential of point 98 tends to be more nearly that of point 100. During the half cycle that points 98 and 63 are positive and lamp 10 is energized, the positive potential of point 98 is then decreased, and since the total potential between points 98 and 99 remains the same the point 99 assumes an increased amount of negative potential. Consequently also the grid potential at point 46 being previously negative now becomes more negative, thus decreasing the current in the left plate circuit and lamp 10.

On the next half cycle when lamp 11 and its circuit are energized the polarities have reversed, point 98 being negative but now to a lesser degree, and point 99 being positive but to a higher degree. Consequently point 45, delivering the grid potential to the right hand plate circuit operating on this half cycle, now assumes a decreased amount of negative potential thus allowing an increase in plate current in the right hand circuit and in lamp 11.

Thus it is seen that an increase in conductivity of the electrolyte in cell 28 causes an increased effective energy and brilliance in lamp 11 and a decreased effective energy in lamp 10.

If the conductivity of the liquid is decreased from that corresponding to a balanced condition, then the potential between points 98 and 100 is increased and the current to lamp 10 is increased and that to lamp 11 decreased. In either unbalanced condition, balance of course may be restored by proper readjustment of balancing impedance 12'.

The potential at the top of the bridge is brought to the cathode or filament of the vacuum tube when the selector switch 14 is in station 1 (linking in conductivity cell 28 as shown) through contact 1', variable slide connection 54, resistance 51, off-center taps 47 and 48 in winding 26, and intermediate tap 38 of this winding. By adjustment of slide contact 54, an additional alternating potential may in effect be added to the potential of the point 38 so that the indicating circuit may be balanced at a new ratio of the test impedance to the balancing impedance. Departures from this new ratio will again cause an unbalance in the grid potentials and cause unequal plate currents as described above.

The variation in the position of the contact 54 with respect to the resistance 51 is of value in that it allows the use of a relatively small range of possible variations in the variable impedance 12' to balance a wide range of impedance values on the part of the conductivity cell or other impedance element to be measured, the multi-range effects being obtained by suitable settings of the contact 54 with respect to the resistance 51. I accordingly call the combination of sliding contact 54 and resistance 51 a "scale constant selector" in that it in effect changes the scale constant of the variable resistance 12'. Similarly, resistances 50 and 49 may be used to change the scale constants of variable impedance 12' when the selector switch 14 is at station 2 or 3 respectively for the measurement of such impedances as may be placed across the bi-polar connections 7 and 8 in the manifold at the upper left arm of the bridge. The position or value of these scale constant selectors is controlled by dials 15, 16, and 17 respectively as shown in Fig. 1, suitable linkages being provided between each dial and the sliding contact of the corresponding scale constant selector.

Lamps 10 and 11 are neon lamps or equivalent gaseous discharge lamps to which current is supplied by plates 39 and 40 of the vacuum tube 34. This current is pulsating rectified current flowing (as electrons) from the filament or cathode to one plate during one half cycle of the power current, and flowing from the filament to the other plate during the next half cycle of the power current, thus energizing the lamps alternately. By virtue of operating on pulsating current, the lamps can be made quite sensitive to a decrease in the potentials supplied to them. It is a characteristic of such lamps that they will not break down or begin to glow until a certain critical voltage is impressed upon them, but once having started, they may be continuously operated at voltages substantially below the critical voltage. In the arrangement described, however, the lamps are extinguished on alternate half cycles respectively, thereby preventing any discharge or glow when the impressed voltage falls below the critical value necessary to initiate the discharge. However, when commercial frequencies (25-60 cycles) are impressed on the system, the glow of the lamps will appear uniform and constant, and each lamp will appear equally luminous so long as a balanced condition exists.

By operating the lamps respectively on alternate half cycles, the behavior of the two lamps is different according to the value of the modulating alternating cross-potentials between the filament and grids, this value being dependent on the direction in which the bridge is out of balance, as previously described.

With a sufficient degree of unbalance the voltage supplied to the lamp 10 will drop to about the critical value, at which voltage the operation of the lamp is unsteady or flickering. A further unbalance in the same direction will cause the lamp 11 to be completely extinguished. The extinction of the lamp 11 or its flickering behavior is thus indicative that the impedance in the conductivity cell has risen above the value required to balance the bridge. On the other hand, a decrease in impedance in the electrolytic cell below the value necessary for balance will cause the lamp 10 to flicker or go out, and the lamp 11 to glow with somewhat increased brilliance.

The extinction or flickering behavior of one or the other of the lamps provides a far more noticeable indication of unbalance than does a simple comparison in brilliancy between two lamps operative at all voltages. To extend the flickering behavior of the lamps at or near the critical point, I find it useful to shunt condensers, such as condensers 35 and 36, across the lamp. By this means the flickering is increased to a degree that it will serve not only as a preliminary warning prior to complete extinction, but also the rapidity or frequency of the flickering is a function of the degree of unbalance within certain limits, thereby providing further indication as to the state of balance of the bridge.

The indicating circuit may be so constructed that with the sensitivity control 13 shunted out, both lamps will receive a substantially higher voltage in the balanced condition than is required for their operation. Under these circumstances a wide unbalance of the bridge is necessary in order to drop the voltage impressed on one or the other signal lamp to its critical point at which flickering or extinction occurs.

I characterize this behavior by saying that the sensitivity of response is low or that the latitude is wide. This sensitivity or latitude may be changed by varying the position of the sensitivity control 13. As the amount of resistance between the terminals 45 and 46 is increased, there is an increasing potential drop across these terminals. One grid thus receives a different potential than the other, and by virtue of the cross connection to the grids, each grid thus becomes more negative with respect to the filament during the time current is passing through it to the corresponding plate. The effective resistance in each plate circuit is thereby increased to any desired degree, and to obtain the maximum sensitivity or minimum latitude I set the variable resistance 13 so that both lamps are receiving only slightly greater than the critical voltage when the bridge is in balance. Any unbalance of the bridge is then immediately reflected in the flickering or extinction of one or the other of the lamps depending upon the direction of unbalance.

As previously explained I prefer for the scale markings on dial 12 a logarithmic scale. Balancing impedances 12' must then be given the proper taper so that each position of the dial 12 gives the proper impedance necessary for balance against the particular concentration (or other quality) indicated on the dial. This can be done by tests, measuring for several dial positions the amount of impedance necessary for balance while maintaining the scale constant adjuster unchanged, and using for a balancing impedance during these tests a known variable impedance, calibrated for instance in ohms. Having thus plotted the curve showing impedance as a function of angular rotation of the dial the variable impedance unit can be manufactured accordingly. It is simple to adjust the scale constant selector by tests made with known solutions. Thus when it is desired to measure or control a solution containing in the neighborhood of 20 to 30 p. p. m. of Na$_2$SO$_4$, a test solution containing say 25 p. p. m. of Na$_2$SO$_4$ is introduced into the conductivity cell which is to be used and brought to a known temperature, say 75° F. The cell is connected to the bridge connections, and the balancing impedance set so that 25 on the logarithmic scale of dial 12 is opposite 75 on the temperature scale. The bridge is then brought in balance by adjustment of scale constant selecting dial 15, operative on the position of sliding contact 54 with respect to resistance 51. The scale constant selector is then left at this position for future measurement of solutions of this nature in the cell used in calibration, and the readings on dial 12 under these conditions will be directly in terms of p. p. m. of Na$_2$SO$_4$. Recalibration may be resorted to if a pronounced change in concentration causes the readings to run off the scale, or if the chemical nature of the solution changes, or if a cell with different constants is used. Calibration of this type is particularly advantageous in connection with complex solutions where the total concentration may vary but the chemical nature of the solutes remains substantially the same. By calibration with such a solution in which the total concentration is known, the concentration of similar solutions may be determined without specific knowledge of the relationship between conductivity and concentration of the individual chemical constituents.

When using the instrument as a measuring instrument, it is preferable to operate at maximum sensitivity and to gradually adjust the variable impedance 12 until first one lamp flickers and then the other. The mean between the positions at which the first and second lamps start to flicker respectively then corresponds to an accurate measurement of the units desired, for example, impedance, conductivity, salt concentration, or the like the instrument having been previously calibrated therefor as described above.

In using the instrument for a control or warning device, I set the sensitivity control to correspond to the allowed latitude rather than using the maximum sensitivity. For example, an industrial plant may require that a certain stream of water have not less than 40 or more than 60 grains of total salts per gallon. Having previously calibrated the instrument to set the scale constant selector so that the constants with regard to units, chemical nature of the salts concerned, and cell characteristics are taken care of so that the scale is direct reading, I set the figure 50 on scale 160 as shown in Fig. 5 opposite a temperature on scale 157 corresponding to the average temperature of the stream. A portion of the stream is diverted and caused to flow through conductivity cell 28. I then adjust the sensitivity control to a point where the lamp will respond only to unbalanced conditions greater than correspond to 10 units on the scale 160. If under these conditions the salt content of the stream exceeds 60 grains per gallon, the lamp 10 starts to flicker, and if the salt concentration falls below 40 grains per gallon, light 11 starts flickering. Visible indication of the salt content of the stream is thus provided the operator as to whether it is above, within, or below prescribed limits. If desired, relays may be used in conjunction with or in place of the lamps to provide automatic control of the conductivity, salt content, and the like, by means of relay controlled valves or the use of other relay controlled equipment. Further means of sensitivity control may also be used in conjunction with the relays, as shown in Fig. 2.

The operation of the circuit shown in Fig. 6 is essentially similar to the operation of that shown in Fig. 2 except that the potentials delivered to the grids are substantially higher than was the case in Fig. 2. In the case of Fig. 6, the modulating potentials between the cathode 37 and grids 41 and 42 may be termed "cross-potentials" as in the case of Fig. 2, although in Fig. 6 the potentials concerned are not those across the diagonal of a bridge, but are simply the potential across the conductivity cell in the case of grid 42, and the potential, across the variable impedance 12', in the case of grid 41, these potentials being supplemented, if desired, by the additive or subtractive potentials of the scale constant selector and the resistors 23 and 24.

Other signal means may, of course, be used instead of the neon lamps. For the reasons set out above, I prefer to use signal means which display a discontinuous behavior at or near a critical voltage, but other means, such as ordinary incandescent lamps, might also be used, the signal strength of which is a continuous function of the applied voltage. Sounding means, voltage meters, or other indicating devices might also be used to show the relative energization of the two side branches of the indicating circuit.

Various means are included in the circuit shown in Fig. 2 for voltage compensation whereby changes in line voltage or voltage drop in winding 26 due to load in winding 22, if on common core, may be partially compensated for. These devices may be dispensed with if their function is not necessary for sufficiently accurate results. Compensating resistances 23 and 24 tend to counteract the effect of varying bridge loads on the plate potential decreasing the amount of negative potential of the grids. An auxiliary secondary winding 26 is used to energize the lamp circuit rather than drawing on the main secondary winding 22 in order to decrease the load effects of the bridge on the signal system.

The grid control method of varying the sensitivity is likewise effective as a voltage compensating device in that with decreased power voltages, the effective resistance in the lamp circuit is also decreased due to smaller amount of negative potentials on the grid.

Circuits other than that illustrated in Figs. 2 and 6 may be used to embody my invention. The circuit shown in Fig. 2, however, combines many advantages, among which may be mentioned the use of critical potential signal means, rectification of the current thereto, amplification of the cross potentials of the bridge and its effect upon the potential delivered to the lamps, a grid control means combined with a unitary sensitivity adjusting device, various automatic means for compensation of voltage variation, and the substantial confining of all rectified current to the indicating circuit so that little or no rectified current passes through the conductivity cell, thereby avoiding polarization and electrolysis.

The triplication of the cell arm of the bridge combined with selective switch 14 makes it possible to have permanent connection to three different conductivity cells which may be tested for their impedance value or the conductivity of the solution therein by properly setting switch 14. The conjugate switch positions for switch 14 insure that the proper scale constants are automatically in circuit when one of the three cells is selected by means of a switch, the scale constants having previously been adjusted for each cell with regard to the constant of the cell and the magnitude of the conductivity or similar property of the solution being tested by prior calibrating operations or similar expedients. Usually one cell will be used for the continuous indication of a given stream or body of liquid, while the other cells may be used to test spot samples or for other purposes.

The construction of the bridge is such that one or the other of the electrodes in the conductivity cell may be grounded.

The use of two variable impedances in the balancing impedance 12' combined with selective switch 18 which will throw one or the other of the said impedances into effect, increases the flexibility of the apparatus since the magnitude and characteristics of the impedances may be differently chosen to suit various purposes.

The conductivity cells illustrated in Figs. 3 and 4 are particularly characterized by having a current carrying zone free from any obstruction such as spacing elements and the like. The absence of any such surfaces, which frequently tend to absorb salt or otherwise become conductive, is of particular value when testing liquids of very low conductivity where any surface conduction would induce large errors. These cells are further characterized by their electrode configuration comprising a cylindrical sleeve electrode of relatively short length, an inner coaxial cylindrical electrode extending substantially beyond the ends of the sleeve electrode, and spacing elements substantially removed from the annular zone of conduction between the two electrodes.

The conductivity cell shown in Fig. 4 is particularly adapted for the testing of isolated samples and need only be immersed in the liquid in order to be operative.

The conductivity cell shown in Fig. 3 is particularly adapted for measuring the conductivity of a continuously flowing stream or of a diverted test stream which may be either returned to the main body of the stream or to waste after passing through the cell. A continuous stream of liquid is thus passed through the cell at all times, entering the cell at inlet 102 and issuing from the cell at exit 103. Both of these connections may be grounded due to the fact that they are electrically connected only to one electrode, namely, the inner electrode. This feature is of particular advantage in that ordinary metallic pipe connections may be used for conducting the entering and leaving streams.

A feature of my construction is that it may also be used with the electrode member 104 completely removed, in which case the T's 109 and 112 form together one electrode, the sleeving 105 constituting as before the opposite electrode. This is particularly advantageous when the cell is used with liquids on relatively high conductivity.

While my invention is illustrated with reference to preferred embodiments, the scope thereof is not limited to the details shown. In place of the bridge shown, any alternating current network may be used which provides a similar cross potential, i. e., modulating potential dependent on the relative values of the test and control impedances and which indicates balance as the ratio of the impedances passes through unity, or through any other value of the ratio predetermined by the addition of a known supplementary or shifting potential to the cross potential. In place of the indicating circuit shown I may use any indicating circuit having a side circuit energized on synchronous half-waves modulated by the cross potential proper or by the supplemented cross potential. By these means I obtain an energization of the side circuit which is a single function of the ratio of the impedances, so that a different degree of energization is obtained for each value of the ratio.

In the bridge circuit described it is not necessary for balance of the indicating means that the ratio between the impedances of the two upper legs of the bridge equals that between the two lower legs as in a Wheatstone bridge since a supplementary source of potential is introduced to the diagonal or cross potentials.

It is seen that the diagonal cross-connection branches out from the upper corner of the bridge into two branches bridging across a third element in the lower part of the bridge, thus forming in effect two responsive control circuits.

Furthermore as the grid circuits require a certain, athough small current to be operative the criterion for balance is not absence of current in the diagonal circuits as in the Wheatstone bridge but rather the presence of balanced currents in the two branches.

By using two side circuits of this type, arranged so as to be oppositely responsive to changes in the ratio of test impedance to balancing impedances, the unbalance is made to result in an accentuated difference in energization of the two side circuits. This is advantageous in a number of respects, among which is the fact that the relative energization of the two circuits may be relied upon rather than the absolute value in a single circuit, thus making possible a direct comparison of two signal means energized by the respective circuits, and the like.

While I have particularly mentioned a system for indicating or measuring conductivity and related properties of liquid solutions, it will be clear that my method and apparatus are suitable for the measurement, indication, or control of the impedance and related properties of any impedance element.

It should be clear also that I have provided a novel method of measuring or indicating the impedance of impedance elements utilizing a balancing impedance and an electric network comprising two means such as signal lamps differentially energized in response to a departure of the ratio of the two impedances from a predetermined value comprising applying potential to the system and varying the balancing impedance until the signals are equivalently energized.

My method also comprises a testing and/or control of impedance elements by a similar method in which the sensitivity of response of the signal means is adjusted to correspond to a prespecified latitude of impedance variation.

I have also provided a method for the automatic control of impedances comprising setting the balancing impedance at or about the mean value of the impedances desired, adjusting the sensitivity control to correspond with the latitude in impedance which is allowed, and connecting electrically operated control devices to the differentially energized arms of the indicating circuit, whereby an impedance reducing control may be actuated when the impedance of the material to be controlled is too high, and whereby an impedance increasing control may be actuated when the impedance of the material to be controlled is too low. In certain cases such as in the case of automatic control relay it may be desirable to supplement the sensitivity adjusting means shown for the signal lamps with other adjusting means such as mechanically adjusting the spring tension of the movable relay contact arm or the like.

I have also provided a method for indicating the direction and magnitude of unbalance (or a state of balance) in an alternating current bridge comprising: energizing a circuit on alternate half waves in synchronism with the alternating current applied to the bridge; modulating the half-waves by the contemporaneous cross potential of the bridge; and indicating or determining the energization of the circuit. Such a method allows the impedance ratio in the bridge to be directly ascertained from the degree of energization obtained in the circuit, since a singular or unique relationship obtains between such energization and such impedance ratio or state of balance in the bridge. As a modification of this method I may utilize the varying degrees of energization in the circuit to variously actuate relays, control devices, and the like, without otherwise indicating the degree of energization.

It should be understood, however, that the invention is not intended to be limited to the details of construction disclosed in the forms described for the reason that various other arrangements of the parts shown or of equivalent parts might be made and various modifications of the forms described might be described, all coming within the scope of the invention, which should be interpreted only by the appended claims.

I claim as my invention:

1. A conductivity testing device including in combination: two impedances, one of said impedances comprising electrode elements adapted to be bridged by the material undergoing test; two current responsive elements; means for energizing said elements; and means responsive to the direction and magnitude of a departure of the ratio of the two impedances from a predetermined value for continuously and oppositely controlling the energization of said elements whereby variations in the ratio of the two impedances produce respective increases and decreases in the energy supplied to the two elements which are substantially proportional to the exciting variation.

2. Apparatus as in claim 1, in which said current responsive elements are electric lamps operative only above a critical voltage.

3. A conductivity testing device including in combination: two impedances, one of said impedances comprising electrode elements adapted to be bridged by the material undergoing test; two current responsive elements operative only above a critical voltage; means operatively responsive to the ratio of the two impedances for continuously and differentially energizing said signal elements; and means for varying the sensitivity of the response.

4. Apparatus for measuring conductivity, comprising: a conductivity cell providing electrode means the impedance between which is a function of the conductivity of the liquid therebetween; a variable impedance; two current responsive elements; separately modifiable electric means for energizing said elements; and means oppositely responsive to an increase and decrease of the ratio of the two impedances with respect to a predetermined value for modifying oppositely the said separately modifiable means.

5. In an apparatus adapted to be connected to a source of potential for measuring the conductivity of a conductivity element, the combination of: a variable impedance; a registering device operatively connected to said variable impedance; two current responsive elements; modifiable means for energizing said elements; and an electric network adapted to be connected to said source of potential and to said impedance element, said electric network including circuit means including means operative in response to a departure of the ratio of the impedance of said conductivity element to the impedance of said variable impedance from a predetermined value for modifying oppositely the energization of each of said elements.

6. In combination with an electrically energized bridge for measuring conductivity, an indicating circuit adapted to receive the cross potential of the bridge and comprising: two current responsive elements; means for energizing said elements; and means continuously responsive to changes in the cross potential applied to said indicating circuit for modifying oppositely the energization of said elements.

7. In a device for measuring conductivity, an indicating circuit comprising: two current responsive elements; electronic tube means including two plate circuits; means for connecting said elements respectively to said plate circuits; and means responsive to changes in the potential across said indicating circuit for decreasing the plate current applied to one current responsive element with respect to the plate current applied to the other current responsive element.

8. In combination in a means for indicating changes in conductivity of a conductivity element: two indicating means; means for modifying the indication of one indicating means when the conductivity being tested becomes higher than a predetermined value; means for modifying the indication of the other indicating means when the conductivity being tested becomes lower than a second predetermined value; and means for varying the range between the two said predetermined values.

9. In combination in a means for indicating changes in conductivity of a conductivity element: two lamp means; means for maintaining said lamps illuminated in substantially equal degree when the value of said conductivity is at a given value; means for gradually decreasing the degree of illumination of one of said lamps when the value of said conductivity drops below said given value; and means for gradually decreasing the degree of illumination of the other of said lamps when the value of said conductivity rises above said given value.

10. In combination in a means for indicating changes in conductivity of a conductivity element: two signal lamps of a type requiring an excess of a critical voltage applied thereto before they become steadily luminous; means for applying to each of said lamps an illumination-producing potential when the value of said conductivity is at a predetermined degree; means for gradually reducing the potential applied to one of said lamps to a value below said critical value as the value of said conductivity decreases; and means for gradually reducing the potential applied to the other of said lamps to a value below said critical value as the value of said conductivity increases.

11. In combination in a device for measuring conductivity: an alternating current bridge; an indicating circuit receiving the cross potentials of said bridge; a pair of indicating means; means for alternately energizing said indicating means on successive half cycles of the energizing potential applied to said bridge; and means for oppositely changing the indications of said indicating means in response to an increase and decrease of the conductivity being tested from a desired value.

12. In an alternating current network for measuring conductivity, an indicating circuit comprising: two electrically responsive means operative only above a critical voltage; means for alternately energizing said electrically responsive means on successive half cycles of current; means for manually adjusting the degree of energization of said electrically responsive means; and further means for modulating the degree of energization responsive to the cross potentials of the network.

13. In an alternating current network for measuring conducitivity, an indicating circuit comprising: two electrically responsive means operative only above a critical voltage; means for alternately energizing said electrically responsive means on successive half cycles of current; unitary means for manually adjusting the degree of energization of said electrically responsive means; and further means for modulating the degree of energization responsive to the cross potentials of the network.

14. In an alternating current bridge for measuring conductivity, an indicating circuit comprising: an auxiliary secondary winding as a source of synchronous potential; electronic tube means embodying a cathode, two grids, and two plates; two gaseous discharge tubes; connections from one discharge tube leading to one terminal of said winding and one of said plates; connections from the other discharge tube leading to the other terminal of said winding and the other plate; a circuit for heating the cathode; a connection between the cathode circuit and an intermediate tap in said winding; a connection from the intermediate tap to one free corner of the bridge; a partly variable resistance closing the other free corner of the bridge; and crossed connections from the grids to the terminals of said partly variable resistance.

15. A combination as in claim 14, in which the connection from the intermediate tap to bridge corner provides therein means for shifting the potential of the intermediate tap with respect to the potential of the corner of the bridge with which it is connected.

16. In an alternating current bridge, for measuring conductivity and joined at one free corner through a resistance variable at least in part, an indicating circuit comprising: electronic tube means having a cathode, two anodes, and two control elements; a source of synchronous potential; auxiliary circuits energized through the respective anodes on alternate half cycles of the synchronous potential; crossed connections from said control elements to the terminal taps of said variable resistance; and a connection from the cathode to the second free corner of the bridge providing an alternating current potentiometer means for shifting the potential of the cathode with respect to the potential of the second free corner of the bridge.

17. An apparatus for measuring conductivity of liquids, comprising: a conductivity cell providing an inner axial electrode and an outer sleeve electrode cooperating to form a substantially unobstructed annular space constituting substantially the interelectrode current carrying region, including means for introducing the liquid to be tested to said annular space, and including spacing means for said electrodes substantially removed from said annular space; a variable impedance operatively connected to a registering device including a logarithmic scale element co-registering with a second scale element, said scale elements being relatively displaceable with changes in the variable impedance; an electric network combining said conductivity cell and variable impedance in different legs of a bridge adapted to be energized by a source of alternating potential; and an indicating circuit energized by rectified synchronous half-waves modulated by cross potentials of the bridge, whereby the circuit energy is changed in a given direction when the impedance of the conductivity cell and associated liquid is greater than that required to balance against the variable impedance and is changed in the opposite direction when the impedance of the cell and liquid is lower than the required value.

18. In combination in a means for indicating the conductivity of a medium disposed between electrodes of a conductivity element: a first and second lamp means; and means responsive to the value of the conductivity of said element for varying the ratio of the luminosity of the first and second lamp means, said conductivity responsive means being adapted to maintain said ratio at a given value when the conductivity is at a predetermined value, to decrease the ratio of luminosity to below said given value when the conductivity is below said predetermined value by decreasing the luminosity of the first lamp means and increasing the luminosity of the second lamp means, and to increase the ratio to above said given value when the conductivity is above said predetermined value by increasing the luminosity of the first lamp means and decreasing the luminosity of the second lamp means.

19. In an electrical network for measuring conductivity by use of a conductivity cell and a balancing impedance, an indicating circuit comprising: two auxiliary circuits; means for energizing said auxiliary circuits; means for graduatedly balancing the relative energization of the auxiliary circuits responsive to the balance between the impedance of the conductivity cell and balancing impedance; and means for balancing the relative energization of the auxiliary circuits independently of the balance between the conductivity cell and balancing impedance.

20. A method for measuring the conductivity of a medium disposed between electrodes by use of an alternating current bridge including a current-responsive element, which method includes the steps of: energizing a circuit including said current responsive element on half waves in synchronism with the alternating current applied to the bridge; and modulating the half-waves by the cross potential of the bridge whereby the value of the conductivity is indicated by the response of said current responsive element.

21. A method for testing conductivity of a medium disposed between electrodes by use of a variable impedance element, which method includes the steps of: passing current serially through said variable impedance element, said electrodes and said medium positioned therebetween; energizing an auxiliary circuit to a degree directly related to the ratio of potential drops across said electrodes and said impedance element; energizing a second auxiliary circuit to a degree inversely related to said ratio; and adjusting the impedance of the variable impedance element to equalize substantially the energizations of the two auxiliary circuits.

22. In combination in a conductivity testing device: an electrically energizable bridge circuit including a conductivity cell in one arm, a balancing impedance in a second arm, and an indicating circuit to receive the cross potential of the bridge; and means in said indicating circuit including a potentiometer to additively combine a selected potential with the cross potential of the bridge, whereby the added potential may be selectively chosen to bring the effective scale constant of the balancing impedance to any desired value.

23. In combination in a conductivity testing device for testing materials at various temperatures: a conductivity cell adapted to receive a material to be tested; an electric circuit associated with said cell and including a balancing impedance adapted to be varied to balance the unknown impedance of the material undergoing test; movable means for varying said balancing impedance, said impedance and movable means being so arranged and constructed that equal increments of movement of said movable means correspond to equal percentage changes in the value being tested; a movable scale element fixed to said movable means and movable therewith; and a stationary scale element positioned to register directly with the movable scale element, one of said scale elements being graduated logarithmically and the other being graduated in temperature whereby a temperature corrected reading of said logarithmic scale at the balanced position of said impedance is afforded by reference to a point on the temperature scale corresponding to the temperature of said material undergoing test.

SOREN L. CHRISTIE.